July 17, 1934.  P. M. MILLER  1,966,825
MOTOR WHEEL CONSTRUCTION
Filed April 29, 1930  2 Sheets-Sheet 2

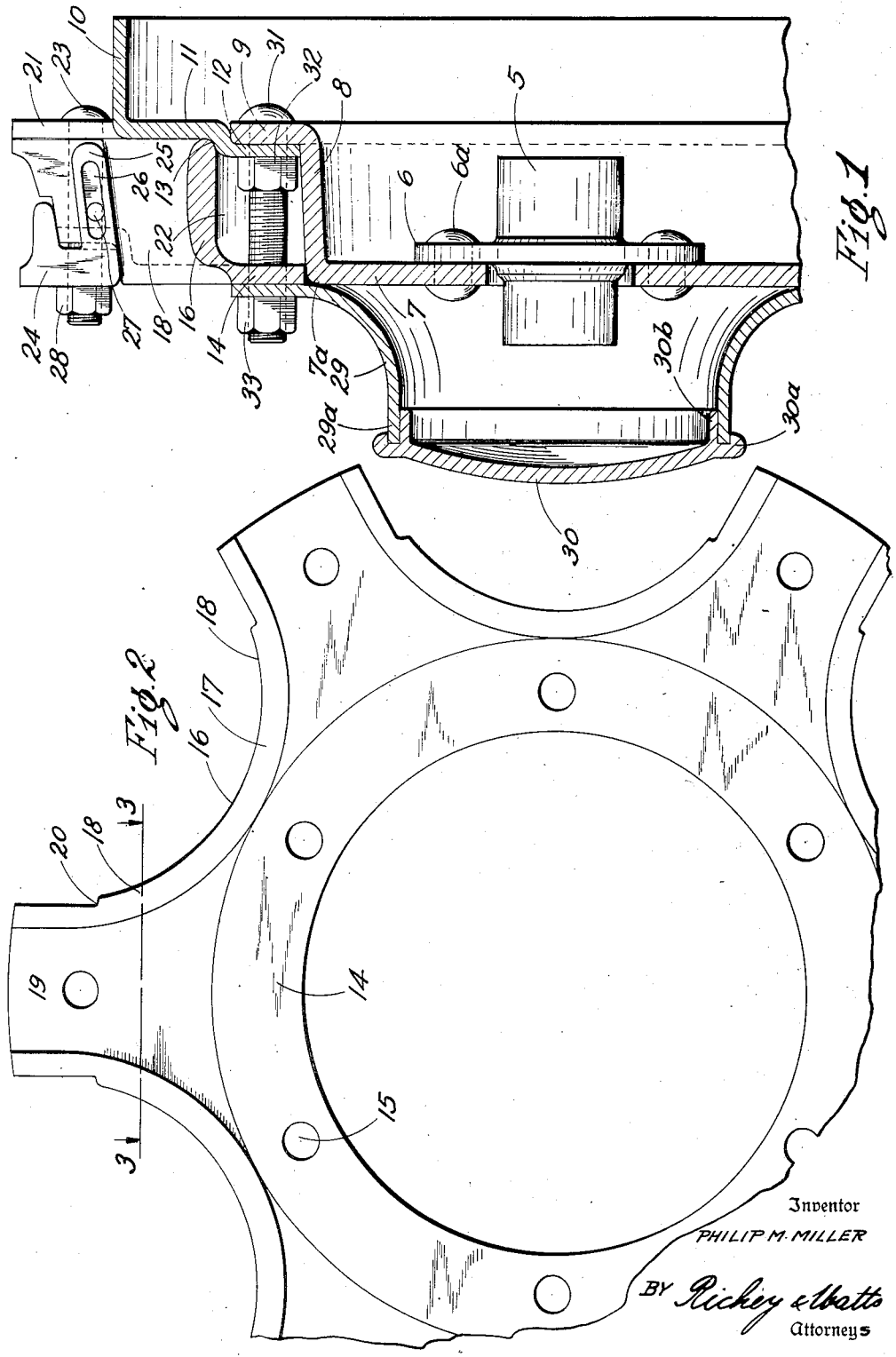

Inventor
PHILIP M. MILLER
Richey & Watts
Attorneys

Patented July 17, 1934

1,966,825

UNITED STATES PATENT OFFICE 1,966,825

MOTOR WHEEL CONSTRUCTION

Philip M. Miller, Youngstown, Ohio, assignor to Miller Devices Inc., New York, N. Y., a corporation of New York Application April 29, 1930, Serial No. 448,343

11 Claims. (Cl. 301—5)

This invention relates broadly to wheels for motor vehicles and is particularly concerned with motor vehicle wheels of the all-metal type.

The principal object of the invention is to provide an all-metal, artillery type wheel for motor vehicles having attractive, symmetrical lines and which is so constructed that its weight may be reduced to a point where the wheel is adapted for both light and heavy duty vehicles while at the same time possessing more than ample strength to withstand the stresses to which it may be subjected while in service on the road.

Another object of the invention is to provide an all-metal wheel assembly for both light and heavy duty vehicles embodying a nave or hub member which is so constructed as to produce a relatively large open central wheel area which lightens and ventilates the wheel as a whole and permits the use of a spider member embodying a minimum amount of metal and having short stubby spokes of arched contour and attractive design.

Another object of the invention is to provide an artillery type wheel embodying parts which may be formed of malleable or cast metal while at the same time the wheel may be made light enough to adapt it for passenger cars and other light duty vehicles, and may even be made lighter than the conventional wooden spoke artillery type wheel, without sacrificing the necessary strength.

The foregoing and other objects and advantages will become apparent in view of the following description taken in conjunction with the drawings, wherein:

Figure 1 is a substantially central transverse sectional view of the major portion of a wheel embodying the features of the invention;

Fig. 2 is a detail view in inboard side elevation of the spider member;

Figure 3:
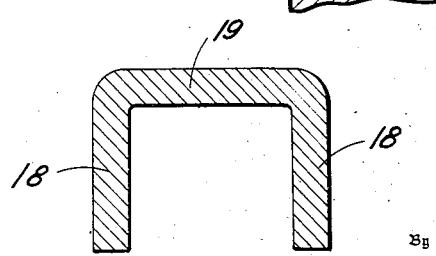
Fig. 3 is a sectional view of one of the spokes of the spider member taken on the line 3—3, Fig. 2.

Referring to the drawings in detail, and first to Figs. 1, 2 and 3, the numeral 5 generally designates the hub of the wheel which is provided with a substantially disk shaped wall or flange 6 having secured thereto a continuation 7 which is extended radially for such distance as will permit the use of a spider member having a relatively large open central area and short spokes.

The disk like wall 7 is transversely offset at 7a and extends transversely for substantially the entire width of the wheel body, thus providing a transverse ledge or spider supporting seat 8. At the inboard side of the wheel, the wall which defines the seat 8 terminates in a radially extending attaching flange 9. While the continuation 7 of the wall or flange 6 may be formed integrally with the latter, as shown in the present instance, these parts are secured together by rivets 6a. With this type of construction, the hub together with the flange 6 may be a forged unit, while the cup shaped portion defined by the wall 7, seat 8 and flange 9 may be a separate forging or a malleable casting.

It will be seen that this type of central wheel supporting member provides a relatively large open central area which lightens and ventilates the wheel as a whole and permits the use of a spider member of the type to be described.

To provide a cooperative reinforcing construction, a particular type of brake drum, generally indicated at 10, is provided, the web 11 of said drum being formed with a transversely offset portion 12 adapted to engage the attaching flange 9 of the central nave member. This offset portion 12 defines a seat 13 for the inboard wall of the spider member. This type of drum member may be manufactured of high carbon or hard wear-resisting metal without unduly increasing the cost of the drum, since the amount of material required is considerably less than with the conventional type of drum wherein the web extends to the central hub or axis of the wheel. By interlocking the web 11 of the drum with the attaching flange 9 of the central nave or wheel-supporting member, a cooperative reinforced construction is provided which stiffens and renders the parts more rigid as a whole.

By referring to Figs. 2 and 3 in conjunction with Fig. 1, the construction of the spider member will be readily understood. This spider member may be, and preferably is, formed of cast or malleable metal. The outboard wall of the spider member is formed with a central attaching or bolting flange 14 which is provided with a plurality of bolt holes 15. Radially outwardly from the flange 14, the said outboard wall merges into a transverse wall 16 which is arched and flared radially as at 17 and terminates in the side walls 18 of the channel shaped spokes generally indicated at 19, said side walls being formed with side seats 20 to accommodate clamping lugs, hereinafter referred to.

The brake drum 10 is adapted to seat snugly against the inboard side walls 18 of the spokes 19 and close the channels at this point, and to complete this closure structure said drum is provided with a plurality of radially extending plates or projections 21, there being a plate or projection for each individual spoke 19. These plates or projections 21 may be welded or otherwise secured to the periphery of the drum. It will thus be seen that when the spider and drum are clamped together in assembled relation, the spokes are completely closed on the inboard side of the wheel while at the same time the base of each spoke opens into a chamber 22 between the transverse seat 8 and the transverse wall 16 of the spider member.

These projections or plates 21 also serve as anchors for lock bolts 23. While any suitable type of rim-mounting assembly may be utilized with the spider member, I have shown in the present instance a locking lug assembly substantially of the type disclosed in my application Serial No. 387,776, filed August 22, 1929. Briefly, this assembly comprises a locking lug 24 provided with side arms 25 formed with slots 26 adapted to receive a pin 27 which is rigidly secured transversely in the end of each spoke. These side arms 25 are adapted to slide on the inclined seats 20 formed in the side walls 18 of each spoke. A swivel nut 28 is threaded on the end of the bolt 23, and by unscrewing this nut the lug 24 is moved outwardly until it clears the tire rim, not shown, whereupon the rim may be removed while said lug remains associated with the end of the spoke. To obtain a better understanding of the construction of this lug assembly, reference may be had to my application above noted.

To close off the open central nave area of the wheel and complete the symmetrical contour of the wheel, I provide a shell member generally indicated at 29, said shell member being provided with an arched body portion which is flared radially and is adapted to fit flush against the flange 14 of the spider member. The shell 29 is extended transversely outwardly as at 29a and on the end of the shell member a cap 30 is secured. In the form shown in Fig. 1, said cap is provided with a rounded peripheral bead 30a and a telescoping flange 30b which is adapted to fit into and frictionally engage the end 29a of the shell 29.

In assembling the parts of the wheel, the spider member is applied over the central nave member with the inboard side of the base of each arched transverse portion or wall 16 seating on the shoulder 13 provided by the offset portion 12 of the drum 10, and the flange 14 seating on the periphery of the disk like wall 7. Locking bolts 31 are passed through the attaching flange 9 of the central nave member, the offset portion 12 of the drum member 10, the outboard flange 14 of the spider member and the peripheral edge of the shell 29. These bolts are initially locked to the flange 9 and drum 10 by nuts 32 so that they rigidly form part of this assembly. The spider member and nave covering shell are demountably assembled with relation to the remaining parts by means of lock nuts 33 on the outer ends of the bolts 31.

From the foregoing, it will be seen that the central nave member permits the use of a spider member which is diametrically normal or straight relatively to its axis, that is the side walls of the spider member lie in a substantially straight radial plane. Due to this nave construction, the metal utilized in the spider member is reduced to a minimum, while at the same time the parts when in assembled position cooperatively reinforce one another and materially strengthen the wheel as a whole. This construction makes it possible to provide a wheel which is relatively light in weight and may be adapted for light duty vehicles.

The open channel spokes together with the chamber 22 and the open nave portion of the wheel provide a ventilating means which rapidly dissipates heat generated in the wheel when in service on the road. The member defined by the disk like walls 6, 7 and the transverse portion 8 and flange 9 may be a forging and of rugged construction to support the wheel member, the load being transmitted in a substantially straight line from the spokes of the wheel or spider member directly to the hub of the vehicle through the walls 7 and 6 of the central nave portion of the wheel.

Figure 4:
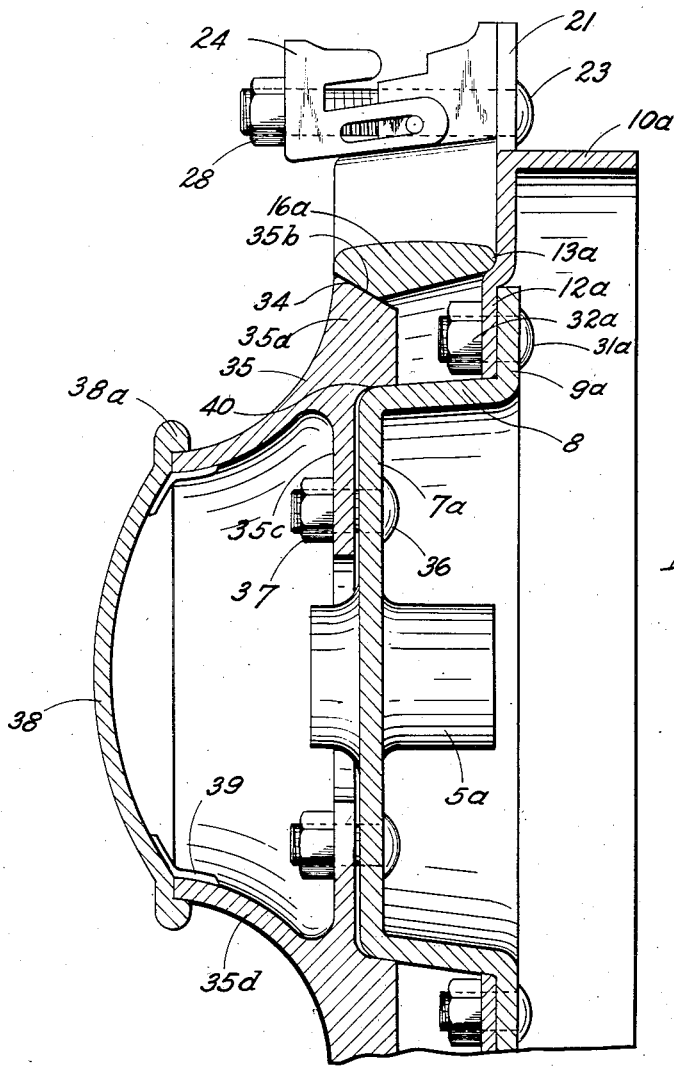
Fig. 4 is a view similar to Fig. 1 of a modification in structure.

In Fig. 4, a modification in structure is shown, the central nave or wheel supporting member in this instance is substantially the same as that shown in Fig. 1 with the exception that the wall 7a is formed integrally with the hub 5a. The transverse seat in this instance is indicated at 8a and the radial attaching flange at 9a. The spider member, in the form shown by Fig. 4, is slightly modified in structure to accommodate a different form of mounting. The transverse wall 16a of the spider is formed at its outboard side with a beveled face 34. A combined wheel locking and shell member, generally indicated at 35, is provided and is formed with an annular clamping and spider supporting portion 35a formed with a beveled edge 35b adapted to engage the face 34 of the spider member. In this instance, the central nave member is permanently secured to the drum member by means of bolts 31a and nuts 32a. The combined shell and spider locking member 35 is formed with a radially inwardly extending flange 35c adapted to be demountably bolted to the disk like wall 7a by means of bolts 36 and nuts 37. The transverse outer end of the combined shell and spider locking member 35 is reduced in thickness and terminates in a nave covering shell portion 35d on which a cap 38 is frictionally engaged by means of prongs 39 and the peripheral bead 38a. A shoulder or ledge 40 is formed in the interior portion of the member 35, said shoulder being adapted to seat on the periphery of the wall 7a, the construction preferably being such that a slight clearance is permitted between the flange 25a and the wall 7a to permit a tight clamping action when the nuts 37 are tightened on the bolts 36.

In assembling this form of wheel, the central nave member being permanently associated with the drum 10a, the spider is applied against the drum with the inboard side of the arched body wall 16a engaged on the shoulder 13a. The member 35 is then clamped against the spider member and secured in tightly clamped position by tightening the nuts 37 on bolts 36. The cap 38 is then applied to complete the assembly. It will be noted that in this instance all locking bolts are covered from exterior view by the shell assembly.

It will be understood that certain modifications and changes in structure may be adopted without departing from the scope of the invention as defined by the appended claims.

Having thus described my invention, I desire to secure the same by Letters Patent:

1. A metal wheel for motor vehicles comprising a hub barrel having a disc-like wall projecting radially a substantial distance therefrom to provide a relatively large open area around the hub and lighten the wheel construction as a whole and permit the use of a short-poked spider member, said wall being offset transversely of the wheel to form a spider support and said offset portion merging into a radially flanged portion, a drum member formed with an offset flange which is interlocked with said radial flange, a spider member formed with relatively short projections defining the spokes of the wheel, said spider member being formed with a central flanged wall which rests on said hub wall, the inner wall of said spider member resting against said drum member with its edge portion fitted into the offset formed in the wall of said drum flange, and means for securing the parts in assembled relation.

2. A metal wheel for motor vehicles comprising a hub barrel having a disc-like wall projecting radially a substantial distance therefrom to provide a relatively large open area around the hub and lighten the wheel construction as a whole and permit the use of a short-spoked spider member, said wall being formed with a transverse spider-supporting flange which extends for substantially the width of the wheel body and terminates in a radial projecting attaching flange, a drum member formed with a concentric flange having an offset therein which engages with said peripheral flange with its edge resting on said transverse flange, a spider member formed with a concentric inwardly arched body portion and relatively short hollow projections defining the spokes of the wheel, said spider member having a concentric flanged wall which rests on said hub wall, the inner side of said spider member having its edge fitted into the offset portion of the drum, and means for securing the hub wall, drum member and spider member in interlocking engagement.

3. A metal wheel assembly for motor vehicles comprising a hub provided with a radially projecting wall which is extended to provide a relatively large open nave area which lightens and ventilates the wheel and permits the use of a short-spoked spider member, said wall being offset transversely of the wheel and terminating in a radial attaching flange, a brake drum formed with a concentric open wall having an offset therein adapted to interlock with said radial flange, a spider member having a concentric outboard flanged wall resting on said hub wall and an inboard wall adapted for engagement with said offset, said spider member being formed with relatively short radial projections defining the spokes of the wheel, and a shell member surrounding the end of the hub, said shell member, spider and hub being secured together in interlocking engagement.

4. A metal wheel for motor vehicles comprising a hub formed with a disc-like wall projecting radially a substantial distance therefrom to provide a relatively large open area there around which lightens and ventilates the wheel and permits the use of a short-spoked spider member, said wall being offset transversely of the wheel and terminating in a radial flange, a drum member having an offset concentric flanged wall which engages with said radial flange, an annular shell member surrounding the end of the hub and formed with a shoulder portion which rests on the transverse offset of said hub wall, the periphery of said shell member being beveled inwardly with respect to the wheel body, and a spider member formed with relatively short projections defining spokes of the wheel, said spider member being formed with a concentric beveled wall which rests on the beveled periphery of said shell member, the inner edge of said spider member resting on the offset portion of the drum flange, and means for securing the parts in assembled relation.

5. A metal wheel assembly for motor vehicles comprising a hub, a transversely-reduced disk-like wall which is extended radially a substantial distance fom said hub to provide a relatively large open central wheel area which lightens the construction and permits the use of a spider member having short spokes, said wall being formed with a transverse inwardly offset circumferential bearing ledge which terminates in a radial drum-attaching flange, a brake drum having a reduced web which terminates around its open portion in an offset flange defining an annular spider-supporting shoulder, said offset drum flange being locked with said drum-attaching flange and secured in locked position, and a spider member having one side thereof seated on said annular web shoulder and the other side thereof supported by said ledge.

6. In a wheel for motor vehicles, the combination comprising a hub barrel, a disk like wall projecting from said hub barrel a substantial distance to provide a relatively large open area around the hub and lighten and ventilate the construction of the wheel as a whole and permit the use of a short-spoked wheel member, said wall being formed with a transverse wheel member supporting seat which merges into a radially extending wall, a brake drum locked to said latter wall, a wheel member provided with relatively short spokes mounted on the transverse seat in association with said brake drum and radial wall, a shell member in association with said wheel member and transverse seat and adapted to wedge the former into locked position and for contact with said disk wall, locking means fastening said shell member with said disk wall, and a cap mounted on said shell member to prevent ingress of foreign substances into the interior of said shell member.

7. In a wheel for motor vehicles, the combination comprising a nave member formed with a central hub barrel and a disk like wall projecting radially therefrom a substantial distance and formed with a transverse wheel-supporting seat and an inboard attaching flange to provide a relatively large open area around the hub and lighten and ventilate the construction of the wheel as a whole and permit the use of a wheel member which is diametrically normal relatively to its axis having a relatively large central opening and short spokes, a brake drum having a relatively short attaching flange fastened to the inboard flange of said disk like wall to strengthen the periphery thereof, a diametrically normal wheel member having a relatively large central opening mounted on said disk wall in association with said brake drum, means engaged with the outboard side of the disk like wall adapted to position said wheel member on said seat, locking member fastening said means with said disk to hold said wheel member in position, and a cap member adapted to enclose the central part of the disk to prevent ingress of foreign substances into the nave area of the wheel and complete the symmetrical contour of the wheel construction as a whole.

8. In a wheel for motor vehicles, the combination comprising a hub barrel, a disk like wall projecting from said hub barrel a substantial distance to provide a relatively large open area around the hub and lighten and ventilate the construction of the wheel as a whole and permit the use of a wheel member which is diametrically normal relatively to its axis having a relatively large central mounting opening and short stubby arched spokes, said wall being formed transversely with a wheel supporting portion which merges into a radially extending portion, a brake drum locked to said radially extending portion adapted to stiffen the said disk wall as a whole and said brake drum as a whole, a diametrically normal wheel member having a relatively large central mounting opening telescoped on said wheel supporting portion, and means adapted to wedge said wheel member into locked position, said latter means engaging the transverse portion of said disk like wall and including a shell member for preventing ingress of foreign substances into the interior of the wheel.

9. A metal wheel assembly for motor vehicles comprising a spider member having short stubby spokes with arched portions therebetween and a central opening which is bounded at the inboard side of the spider by the bases of said arched portions and at the outboard side of the spider by an annular wall which forms the outer side wall and base of the spokes, and a wheel-supporting member comprising a hub barrel provided with a disk-like wall which is extended radially such distance as will engage and support the outboard annular wall of the spider member and is offset and extended transversely substantially the full width of the spider member and terminates in a radialy extending attaching flange, a brake drum having its web wall locked to said latter flange, and means for locking the spider member in position on the transverse wall of said wheel-supporting member, the entire central area of the wheel being open from the hub barrel to the transverse offset of said disk-like wall.

10. A metal wheel assembly for motor vehicles comprising a spider member having short stubby spokes with arched portions therebetween which define the side walls of open channeled spokes and a relatively large central opening which is bounded at the inboard side of the spider by the bases of said arched portions and at the outboard side by an annular wall which forms the outer wall and base of each spoke, and a wheel-supporting member comprising a hub barrel provided with a disk-like wall which is extended radially to a point adjacent the outboard annular wall of the spider member and is offset and extended transversely substantially the full width of the spider member and terminates in a radial attaching flange, a brake drum having its web wall offset and locked with said attaching flange, the offset portion of said web providing an annular supporting shoulder, and means for locking the spider member on said wheel-supporting member with the inboard arched wall of the spider resting on said shoulder and its outboard wall supported by said disk-like wall, the entire central area of the wheel being open from the hub barrel to the transverse offset of said disk-like wall.

11. A wheel assembly for motor vehicles comprising a hub barrel formed with an annular radially extended wall which is transversely offset to provide a supporting ledge and terminates in a radial attaching flange, a combined hub shell and locking and supporting annulus formed with radially inwardly-extended portions which are clamped to said radially extended wall, a brake drum formed with a transversely offset web which is secured to said attaching flange, a spider member mounted on the periphery of said locking and supporting annulus and engaged in the offset portion of said web, and means for clamping said annulus against the radial wall of the hub barrel to lock the parts in assembled position.

PHILIP M. MILLER.